Dec. 25, 1928.  
B. B. BRODFUEHRER ET AL  
1,696,834  
BED FOR SHOE ORNAMENTING MACHINERY  
Filed Jan. 13, 1926   2 Sheets-Sheet 1
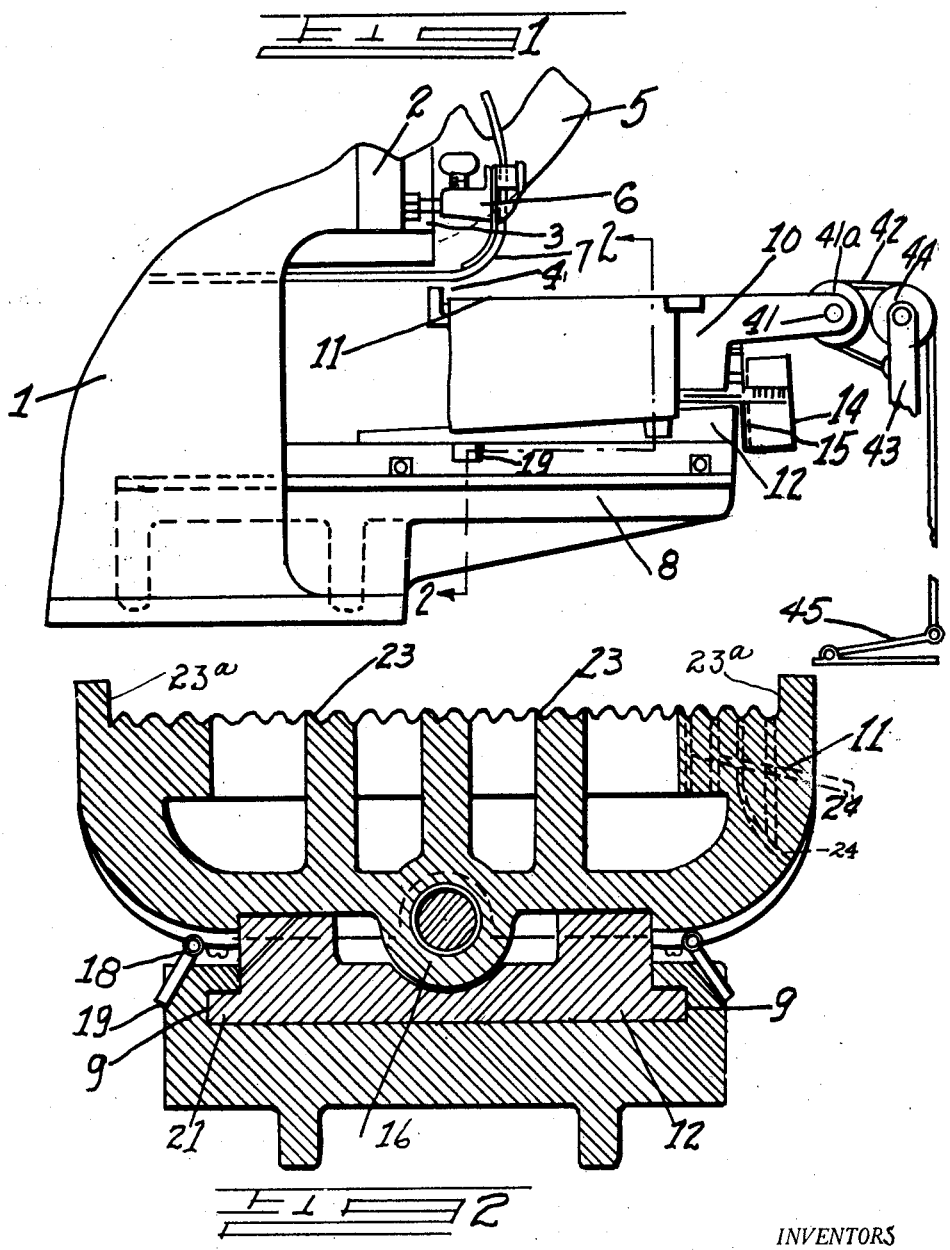

Dec. 25, 1928.                                                    1,696,834
B. B. BRODFUEHRER ET AL
BED FOR SHOE ORNAMENTING MACHINERY
Filed Jan. 13, 1926                              2 Sheets-Sheet 2
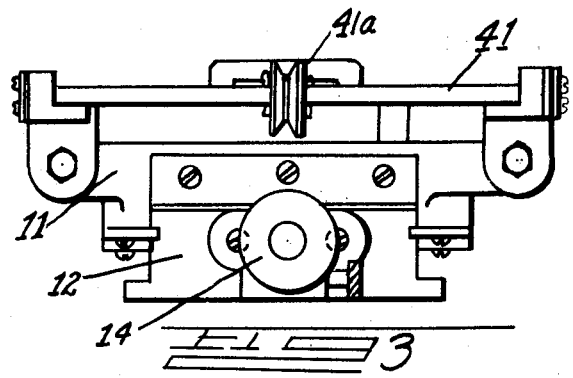
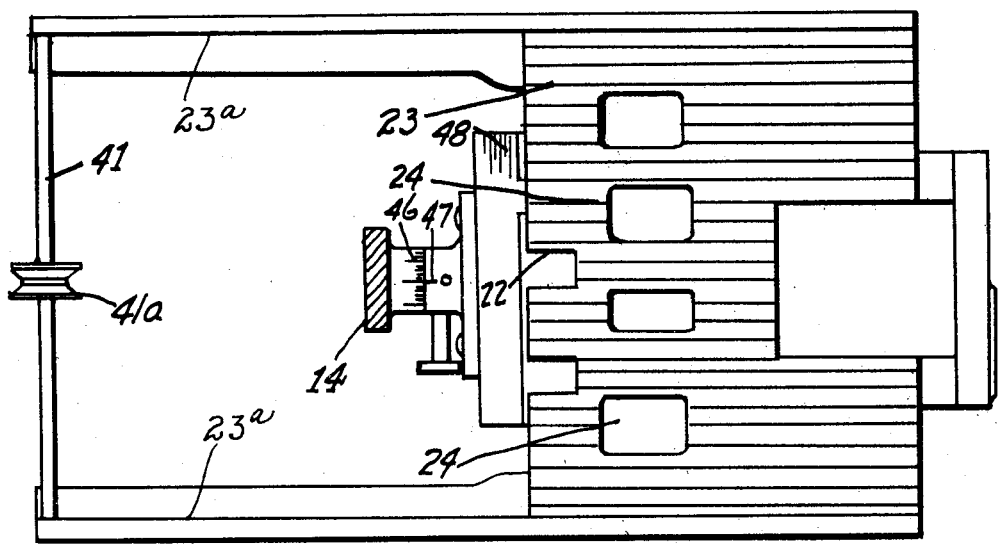
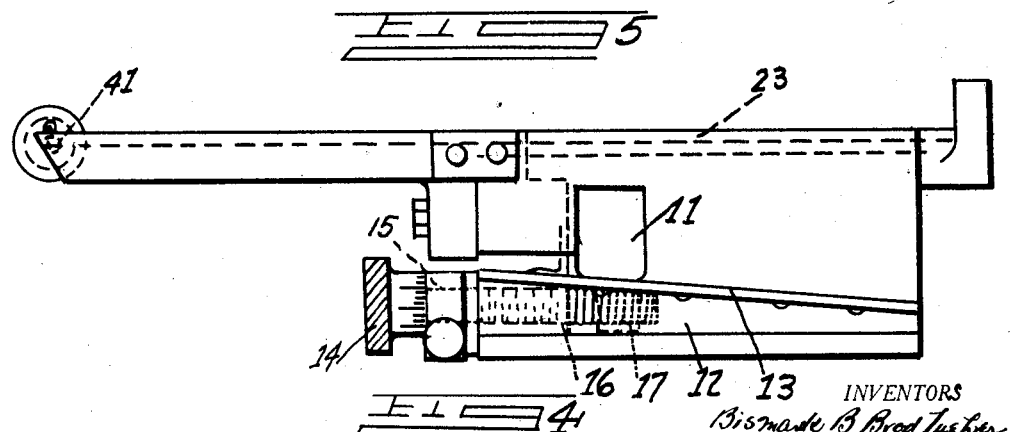
INVENTORS
*Bismarck B Brodfuehrer*
*Benjamin L. Freeman*
*Charles A Foster*
BY
*Allen & Allen*
ATTORNEYS Patented Dec. 25, 1928.

1,696,834

UNITED STATES PATENT OFFICE.

BISMARCK B. BRODFUEHRER, BENJAMIN W. FREEMAN, AND CHARLES A. JESTER, OF CINCINNATI, OHIO, ASSIGNORS, BY MESNE ASSIGNMENTS, TO SAID BENJAMIN W. FREEMAN.

BED FOR SHOE-ORNAMENTING MACHINERY.

Application filed January 13, 1926. Serial No. 80,903.

Our invention relates specifically to a novel independent and preferably adjustable bed particularly for shoe tip presses and cut out machines or machines of similar type with which shoe uppers are ornamented, perforated, or cut out.

In machines for doing cut out work and in machines for perforating and otherwise ornamenting shoe elements, the mechanical principle involved usually consists in either moving a cutting or perforating die into engagement against a shoe element or in providing a moving punch block or plunger, which carries the shoe element into engagement with a cutting die, in each case the object being to cut out or ornament the shoe element with designs of the desired shape and size.

In the art the use of shoe tip presses, in which shoe blanks may be perforated or otherwise ornamented, while held in a flat position, is quite extensive. Many factories are equipped with such machines although they have a common fault in that no provision is made in them for cutting out or ornamenting the shoe blanks in other than flat condition. As linings are usually attached to the outer materials such as the tips, vamps and quarters when assembled, the cutting out or ornamenting of an assembled upper is either impossible or not practical in the ordinary tip press, so that if a tip, vamp or quarter is cut out in flat position and it is desired to cut out the same design in the lining, then much additional labor is required and other manufacturing difficulties are encountered in cutting out the lining in a satisfactory manner.

Quite recently there has been another type of machine developed, which allows sufficient clearance on any side or sides or underneath the ornamenting means so that an assembled or partially assembled upper may be operated upon and any desired ornamentation or cutting out may be accomplished.

In both types of machines, the tip press and the cut out machine, there usually is a rotating member on a crank shaft adapted to move a punch block to work engaging position. In some types of machines the cutting dies are carried by a plunger and in others the punch block carries the work into position against a die. Such machines have been provided with adjustments by which the depth of cut on the work may be varied. These adjustments, to the best of our knowledge and belief, have been provided exclusively on the machine itself. One customary method of adjustment has been accomplished by the provision of an adjustable eccentric which will vary the limit of movement of the plunger. The method of adjusting the die cutting pressure by means of some adjustment forming a part of the machine proper, has been found to be very unsatisfactory and troublesome, particularly where more than one machine is in operation for the use of a number of dies or ornamenting instrumentalities. Such instrumentalities can be very easily broken if too great pressure is applied and owing to the change in adjustment on machines, it often happens that operators are apt to operate a machine when the pressure, as set in the machine, is too great and as a consequence, destruction of the die is likely. This, we appreciate, is not a theoretical defect, notwithstanding, it is one which is encountered in actual shoe shop operation. Some machines have been provided with fiber or brass punch blocks so that when the machine is operated carelessly the die will not be broken, but will seat in the soft punch block. The use of soft punch blocks, however, is undesirable because a punch block when once cut into by the die will have an uneven surface resulting in poor work until the block is replaced.

The only practical method seems to be an independent bed which is readily set so that any and every die or ornamenting instrumentality can be used in conjunction with the machine without any damage. The bed itself can then be brought up to the proper operating position. By forming an entirely separate, independent bed unit distinct from the machine and readily accessible to manipulation by the operator, a satisfactory means of adjustment for controlling the proper operating height for various dies or ornamenting instrumentalities is provided. The bed can, of course, be placed in fixed position on the machine and used as a support either with or without the adjustable mechanism. Where machines are provided which are made to a high degree of accuracy and where flat bed dies or ornamenting means as well as anvil type dies or ornamenting means may be interchangeable, then the adjustment may not be necessary and provision may then be made to lock the adjusting mechanism in fixed position. In such machines there is no necessity for adjustment as the operating height of each individual die is determined and tabulated and a record kept, so that operators are not likely to ruin dies in operating. A non-adjustable machine is particularly desirable when the machines are so accurately constructed that they can be maintained in uniform adjustment, and the same manufacturer provides both the machine and the dies.

It is one of our objects to provide, for a tip press or cut out machine, an independent bed which may be movable from work feed to cutting position and which will preferably be adjustable entirely independently of the machine. If the machine has dies of the flat bed type in which there is very little clearance for inserting work to the cutting position, it is our object to provide preferably an adjustable bed which will enable an operator to make adjustments for depth of cut without taking any chances of ruining the dies. If the machine is of the anvil type which provides ample clearance for inserting partially assembled or assembled work, it is our object to provide a fixed, adjustable or slidable bed. It is also within the range of our invention to provide both a slidable and an adjustable bed as our invention has a combination of desirable features consisting primarily in the provision of a bed which shall be independent of the machine and which may have the added merit of being either slidable, fixed or independently adjustable, or either or both, depending essentially on the type of machine in combination with which it is to be used.

Ordinarily our bed is adapted to carry the cutting die and in this connection when the bed is used for this purpose, it is our object to so construct the bearing surface between the bed, and the die that should cut out or perforated chips drop between the die and the bed, they will fail to throw out the alignment of the die on the bed, and they will not vary the proper depth of cut of the die on the work. When we refer to a cutting die we refer to the cutting edges which perform the cutting operation, it being understood that such cutting edges are ordinarily formed on or attached to a mounting plate.

Referring to the drawings in which we have illustrated several preferred embodiments of our invention.

Figure 1 is a side elevation of a shoe cutting machine of the cut out type showing the preferred disposition and structure of one form of our novel bed.

Figure 2 is a section of the bed as indicated by the lines 2—2 in Figure 1.

Figure 3 is an end elevation of the bed illustrated in Figures 1 and 2.

Figure 4 is a side elevation of the bed illustrated in Figure 3.

Figure 5 is a top plan view of the bed illustrated in Figure 4.

Generally indicated at 1 is the base or supporting structure of the machine which has at its front end a slideway 2 in which is mounted for reciprocating movement, a punch block 3. The punch block is movable toward and from an opening 4 formed on the front of the base and is preferably driven by a shaft carrying a fly wheel 5, a fragment of which is shown in Figure 1. As required in most machines of this type we have shown on the front of the base and adjustably mounted guide plate 6 over which passes a continuous web of paper 7. The web passes rearwardly of the machine and crosses the line of movement of the block, and forms a yielding seat for cutting elements of the die mounted inversely on the bed, subsequent to their passage through the work which in operating position is inserted in the opening 4. Usually formed integrally with the base and extending outwardly from the front of the base is a bracket 8, which in the machine illustrated, has an upper portion which is provided with slideways 9 in which the bed generally indicated at 10 is engaged.

*The flat bed type of bed.*

A preferred bed of the adjustable type for flat bed work is composed of an upper member 11 and a lower member 12 having slidable engagement each with the other between two reversely disposed inclined plane surfaces 13. A dial 14 mounted on a spindle 15 is rotatably mounted in one of the members having inclined plane engagement. A threaded boss 16 on the other member provides means of moving the members diagonally lengthwise with relation each to the other as the spindle has screw threads 17 which engage the threads in the boss 16. As the upper member 11 usually forms the actual support for the work or for the die with which the work is cut, we have found it advisable to provide means for retaining the upper member 11 in fixed position with relation to the line of movement of the plunger. A convenient way of temporarily holding the member 11 in case the bed is fixed and the die is slidable on the bed may be provided by hinges 18 which are adapted to engage slots 19 formed in the upper portion of the bracket 8. The strain of the impact of the plunger against the bed is evenly distributed on the base so that there is no strain on the mounting of the work support, which in the embodiment of our invention illustrated in Figures 1-5 is the tracks 21 of the lower member 12 within the slideways 9.

The bed 10 in some types of flat bed machines may carry a cutting die. The work is disposed in the opening 4 between the paper web and the die, and with the downward stroke of the plunger, the work is carried into engagement with the die, as is also the paper web, and as has been described, the cutting elements of the die pass through the work and seat in the paper web. For conveniently mounting a die on the bed a notch 22 is provided in the upper member 11 of the bed in which the die may be retained with a thumb nut. Ordinarily, however, the die will be merely positioned on the upper surface of the bed and guided in its movement on the bed by means of the guide rails 23ª. The upper surface of the member 11 is preferably provided with a serrated surface 23 which serves a very useful purpose. If the surfaces supporting ornamenting instrumentalities are flat and chips or other material adhere to these surfaces, the parts are thrown out of alignment and become broken, or poor workmanship results. With the serrated surface, however, the small pieces are cut in pieces either with the tightening of the die on the member 11 or with the first operation of the plunger, and the pieces then fall into the grooves of the serrated surface. The bases of the grooves may be either closed or open and passages as indicated at 24 may be provided to carry away chips formed by the cutting or perforating instrumentalities. It is our belief that the principle involved in providing interspaced engaging portions of a bed or a die which will avoid the possibility of small chips of work or other débris throwing a newly inserted die out of alignment, is broadly new, and it will be obvious that a natural reversal of parts in which the lower surface of a die is provided with serrations and the upper surface of the support is flat, would be a purely mechanical reversal of parts.

It should also be noted in connection with the construction of adjustable beds, one form of which is herein disclosed, in which the bed is composed of two members having engaging inclined plane surfaces that this is but one modification of adjustable bed and that it is within the realm of mechanical equivalency to provide adjustment by other well known means.

Where the bed is slidable we have provided a simple mechanism for mechanically moving the bed from operating position. The mechanism is illustrated in Figures 1, 3, 4 and 5, and consists in a shaft 41 journaled in the upper members of the support. A pulley 41ª mounted on the shaft engages a rope 42 or cable which extends from a pulley support 43 through a pulley 44 and thence to a foot treadle 45. If the machine is made with an inclined base the work support may be permitted to slide by gravity into operating position and may be withdrawn by downward pressure on the foot treadle to the work feed position. (If the die is slidable in a fixed composite base provided with means for adjusting the elevation of the die the rope or cable may be attached to the die. Then if the machine is tilted or has an inclined base the die may be allowed to slide by gravity to operating position. If the base is flat it may be manually moved.) Other mechanism used in cooperation with the machine to automatically move the bed will readily occur to those skilled in the art, it being our purpose to disclose only simple means of moving the bed or die which will leave both of the operator's hands free for handling the work.

As a preferred micrometer adjustment for both the flat and the anvil type of bed by which the relative position of the work support to the ornamenting instrumentalities may be accurately controlled we may as indicated in Figure 5 provide the dial 14 with interspaced indicia as at 46. As the spindle 15 on which the dial is mounted is not slidable in the journal in which it is mounted in the member 12, a zero mark 47 may be inscribed on the outer surface of the journal portion. Other indicia as at 48 on the upper surface of the member 12 may be employed to show the relative position of the upper member 11 with relation to the lower member. Such an arrangement of indicia results in very delicate adjustability. For example, if the degree of angularity of the inclined planes is such that a six inch relative linear travel of the members 11 and 12 would result in a rise of the member 11 toward the line of travel of the block 3 of .360 inches, by providing a thread 16 for the spindle having a pitch of one-twelfth of an inch, one complete revolution of the dial will result in a rise of the member 11 of .005 inches. By providing five indicia on the dial each one will represent an adjustment of the upper member of one one-thousandth of an inch. It will be obvious that such an accessible and accurate adjustability will make it possible to provide an inexperienced operator with a chart showing what position a new die should have on both the indicia 46 and 48, and that the operator will be able to accurately set the die without any risk of ruining the die during its adjustment.

Other modifications which will occur to those skilled in the art in which equivalent functions may be accomplished in an independent bed by the use of well known mechanical equivalents, we consider within the scope of our invention.

Having thus described our invention, what we claim as new and desire to secure by Letters Patent, is:—

1. In combination with a machine having ornamenting instrumentalities, an adjustable bed having a calibrated rotatable adjusting member and a calibrated slidable member with the calibrations on said rotatable member arranged in units of movement of the slidable member and the calibrations on said slidable member arranged in units of adjusted movement of a part of said bed.

2. For use in a shoe ornamenting machine having a frame provided with guiding means, mechanism comprising a die supporting unit provided with means for cooperating with said guiding means in controlling the movement of said unit relative to said machine, said unit composed of upper and lower members and having self contained means for varying the elevation of portions of said unit, and means on said upper unit for cooperating with a fixed portion of said frame for preventing movement of said upper unit excepting in the direction of its elevational movement.

3. For use in a shoe ornamenting machine having guiding means, mechanism comprising a slidable die supporting unit provided with means for cooperating with said guiding means in controlling the movement of said unit relative to said machine, said unit having guiding means for controlling the movement of a die thereon.

4. For use in a shoe ornamenting machine having guiding means, mechanism comprising a slidable die supporting unit provided with means for cooperating with said guiding means in controlling the movement of said unit relative to said machine, said unit having self contained means for varying the elevation of portions of said unit, said unit further having guiding means for controlling the movement of a die thereon.

5. For use in a shoe ornamenting machine having a frame provided with means for holding a die supporting unit in proper operating position, mechanism comprising a die supporting unit provided with means for cooperating with said holding means in controlling the proper positioning of said die supporting unit, said unit having self contained means for varying the elevation of portions of said unit, and means on said unit for cooperating with a fixed portion of said frame to prevent movement of said unit other than in the direction of its elevational movement.

6. For use in a shoe ornamenting machine having a frame provided with means for holding a die supporting unit in proper operating position, mechanism comprising a die supporting unit provided with means for cooperating with said holding means in controlling the proper positioning of said die supporting unit, said unit having guiding means for controlling the movement of a die thereon.

7. For use in a shoe ornamenting machine having means for holding a die supporting unit in proper operating position, mechanism comprising a die supporting unit provided with means for cooperating with said holding means in controlling the proper positioning of said die supporting unit, said unit having self contained means for varying the elevation of portions of said unit, said unit further having guiding means for controlling the movement of a die thereon.

8. In combination in a cut out machine, a member on which a die is adapted to be movably supported, a base on which said member is mounted, guiding means adapted to cooperate with the die on said member, means forming part of said base disposed at an incline to the horizontal, a screw rotatably held in said means, a threaded element on the member engaged by said screw, said member having an inclined bottom portion embodying substantially the full area of the bottom of said member, and resting on the incline of the base, whereby upon revolution of the screw said inclines are caused to change position each with relation to the other thus changing the relative vertical position of the member and the base and without substantially altering the full area of contact therebeween.

9. In combination in a cut out machine, a member on which a die is adapted to be movably supported, a base on which said member is mounted, guiding means adapted to cooperate with the die on said member, means forming part of said base disposed at an incline to the horizontal, a screw rotatably held in said means, a threaded element on the member engaged by said screw, said member having an inclined bottom portion embodying substantially the full area of the bottom of said member and resting on the incline of the base, whereby upon revolution of the screw said inclines are caused to change position each with relation to the other, thus changing the relative vertical position of the member and the base and without substantially altering the full area of contact therebeween and means indicating the degree of movement between said base and said member.

BISMARCK B. BRODFUEHRER.
BENJAMIN W. FREEMAN.
CHARLES A. JESTER.